United States Patent [19]

Koivula

[11] Patent Number: 4,545,778
[45] Date of Patent: Oct. 8, 1985

[54] COG-BELT-DRIVEN, NOISE-SUPPRESSED POWER TRANSMISSION DEVICE
[75] Inventor: Jorma Koivula, Tampere, Finland
[73] Assignee: Oy Tampella AB, Tampere, Finland
[21] Appl. No.: 467,250
[22] Filed: Feb. 17, 1983
[30] Foreign Application Priority Data Mar. 10, 1982 [FI] Finland ................................. 820818

[51] Int. Cl.$^4$ ............................................. F16H 7/02
[52] U.S. Cl. .................................... 474/153; 474/205; 474/188
[58] Field of Search ............... 474/153, 164, 167–170, 474/173, 188, 198, 202–205, 92, 148

[56] References Cited
U.S. PATENT DOCUMENTS 3,338,107  8/1967  Kiekhaefer ..................... 474/153
4,416,649  11/1983  Kohrn ............................. 474/153

FOREIGN PATENT DOCUMENTS 1290403  9/1965  Fed. Rep. of Germany .
1270028  7/1961  France ............................. 474/153
  44372  4/1977  Japan .............................. 474/153

Primary Examiner—Stephen J. Novosad
Assistant Examiner—Thuy M. Bui
Attorney, Agent, or Firm—Ladas & Parry

[57] ABSTRACT

A cog-belt-driven power transmission device comprising a belt pulley having a cogging on the outer periphery and a belt having a corresponding cogging on the inner surface. In order to suppress the noise produced during rotation of the belt pulley one or more discharge channels for air entrapped between the coggings are made in the cogging of the belt pulley and/or the belt, said discharge channels connecting the cog gaps to the atmosphere.

3 Claims, 23 Drawing Figures

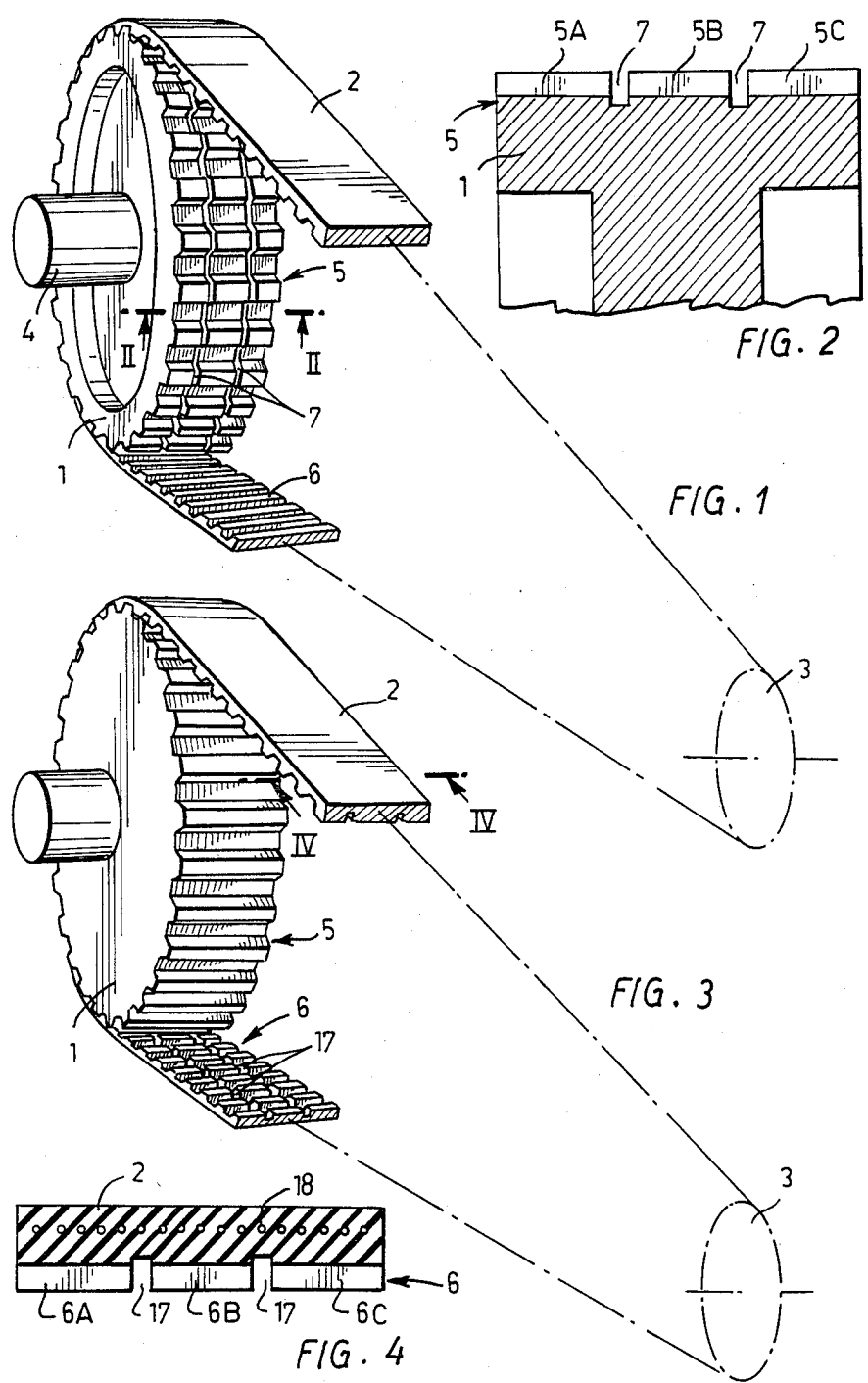

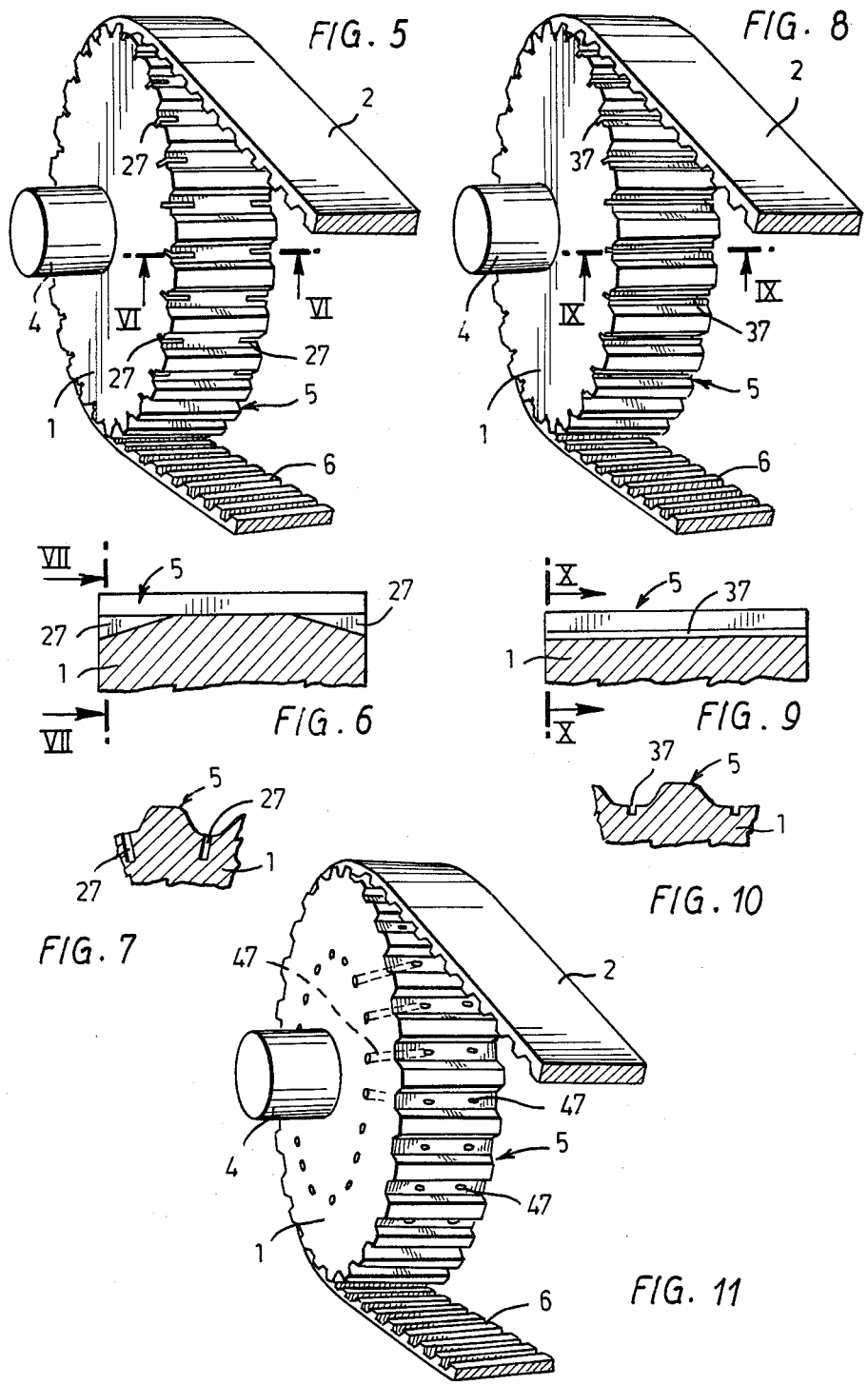

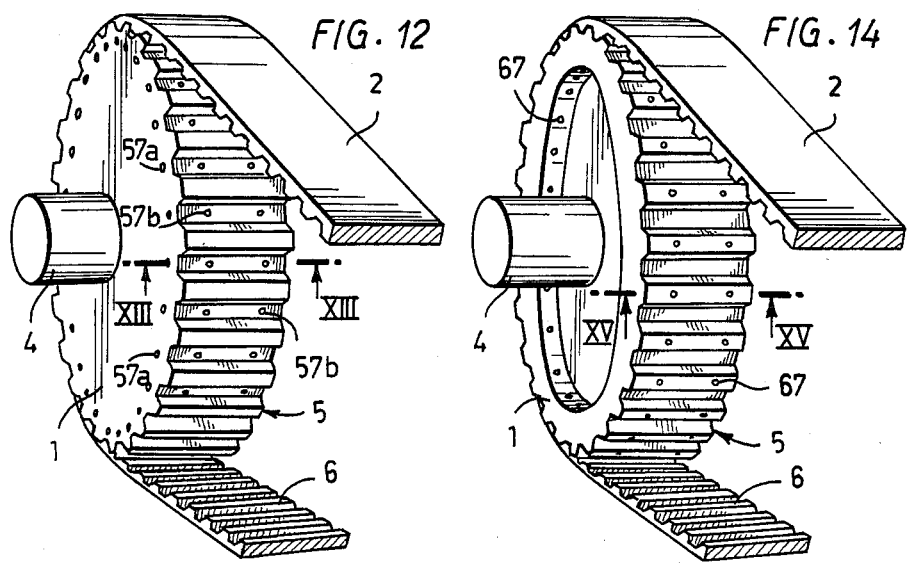
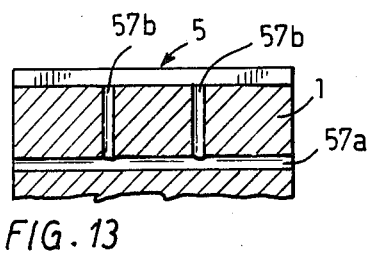
FIG. 13
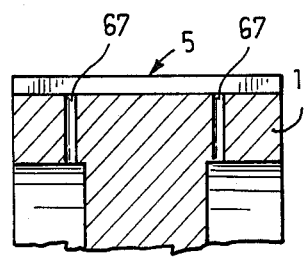
FIG. 15
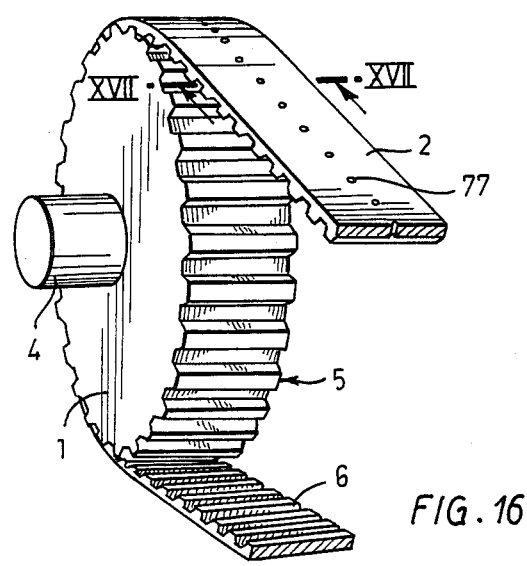
FIG. 16
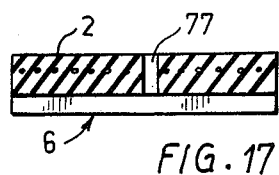
FIG. 17

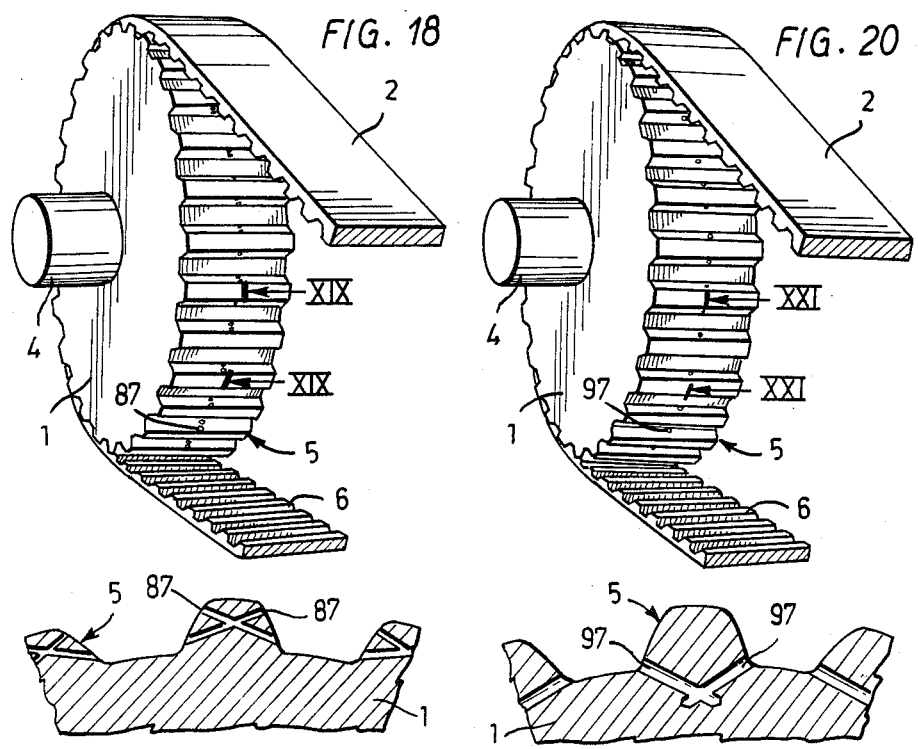
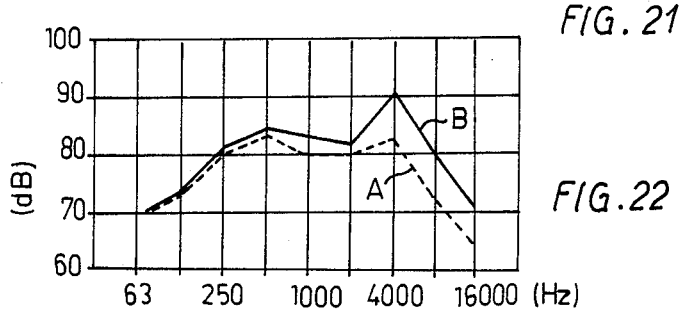
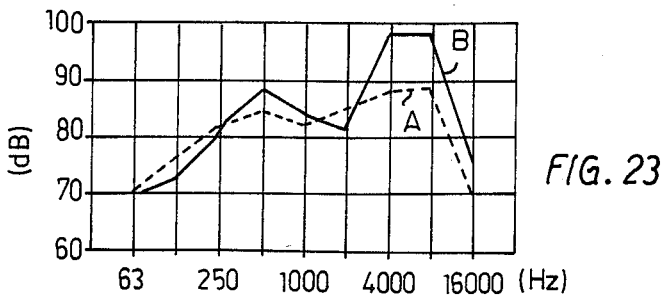

COG-BELT-DRIVEN, NOISE-SUPPRESSED POWER TRANSMISSION DEVICE

The present invention relates to a cog-belt-driven, noise-suppressed power transmission device comprising a belt pulley provided with a cogging on the outer periphery and a belt provided with a corresponding cogging on the inner surface engaging the coging of the belt pulley, whereby the belt rotates around the belt pulley, and a second drive means for transmitting power between said belt pulley and said drive means.

Cog belts have long been used for power transmission instead of gearings, cone belts, chains and similar power transmission means. The cog belt rotates around two or more cogged belt pulleys for transmitting power by means of the belt from a driving belt pulley to a driven belt pulley or pulleys. The cogging provided in the belt and in the belt pulleys serves to prevent sliding of the belt on the belt pulley.

When it is desirable to use a cog-belt-driven power transmission device in applications in which high peripheral speeds and high transmissions of power are required extremely wide belts must be used. However, such wide belts cause considerable noise problems in the form of a loud whistle. Such a high-frequency whistling sound is due to the escape of air entrapped between the belt and the belt pulley from between the cogs at a very high speed over the entire width of the cog. Such a whistling problem does not occur when narrow belts are used. Attempts have been made to avoid or to reduce the noise problems by enclosing the power transmission devices in noise suppression shields, such as various casings.

From the DOS No. 2,115,843 is known that noise due to the compression of air entrapped between a belt and a belt pulley can be considerably reduced by providing the belt pulley with a peripheral section made of sintered metal. Because of the porosity of the peripheral section, the compression of the air entrapped between the belt and the belt pulley is reduced, which in a corresponding manner reduces the noise produced. However, to provide the belt pulley with a peripheral section of such a special metal is expensive and difficult as far as manufacturing techniques are concerned.

The object of the present invention is to provide a cog-belt-driven power transmission device which avoids the above-mentioned disadvantages and permits a substantial lowering of the noise level by means of simple measures. This object is achieved by means of a power transmission device according to the invention which is characterized in that the cogging of the belt pulley and/or the belt is provided with one or more discharge passages/channels for air entrapped between the coggings, said discharge channels connecting the cog gaps to the atmosphere.

The invention is based on the idea of arranging for the air entrapped between the coggings of the belt pulley and the belt a possibility of being discharged to the atmosphere without the air being substantially compressed between the belt pulley and the belt. This can be realized, for example, by making in the cog wheel in the direction of rotation thereof or transversally to said direction grooves along which the air can be discharged. In the same way, the cog wheel can be provided with air outlet channels, for example, by making holes from the cogging to the outside thereof or from one cog gap to another. The belt can in a corresponding manner be provided with grooves or with channels formed by holes.

According to one preferred embodiment of the invention, at least one groove parallel to the direction of rotation is made in the cogging of the belt pulley and/or the belt. Due to this, a connection is always provided from the cog gaps through the groove or grooves to the atmosphere when the cogs of the coggings are inserted into the cog gaps. In addition, a wide cog belt can be made to operate like to two or more narrower belts when the groove or grooves divide the cogging of the belt pulley or the belt into a plurality of spaced-apart strips extending in the peripheral direction of the belt pulley or in the longitudinal direction of the belt, respectively. Thus, a wide cog belt will operate in the manner of narrow belts, which have no tendency to cause noise even at high speeds. It is simple to turn one or more grooves on the periphery of the belt pulley, whereby the noise level of a cog-belt-driven power transmission device will be substantially reduced. Instead of the belt pulley or in addition to it, one or more grooves can be formed in the inner surface of the belt in connection with the manufacture thereof. In both cases, the grooves can extend to the bottom of the cogging or preferably still deeper, whereby a discharge passage is provided for the air up to the end and the compression of air in this way is reduced.

A further preferred embodiment of the invention is characterized in that the cogging of the belt pulley and/or the belt is in the direction of rotation provided with spaced-apart channels or holes ending outside the cogging. Due to this, a connection is always provided from the cog gaps through the holes to the atmosphere when the coggings are positioned against each other.

The invention will be described in more detail in the following with reference to the accompanying drawings, in which FIG. 1 is a perspective view of one preferred embodiment of a power transmission device according to the invention, FIG. 2 is a cross-section along line II—II in FIG. 1, FIG. 3 is a perspective view of a second embodiment of the power transmission device, FIG. 4 is a cross-section along the line IV—IV in FIG. 3, FIG. 5 is a perspective view of a third embodiment of the power transmission device, FIG. 6 is a cross-section along the line VI—VI in FIG. 5, FIG. 7 is a section along the line VII—VII in FIG. 6, FIG. 8 is a perspective view of a fourth embodiment of the power transmission device, FIG. 9 is a cross-section along the line IX—IX in FIG. 8, FIG. 10 is a section along the line X—X in FIG. 9, FIG. 11 is a perspective view of a fifth embodiment of the power transmission device, FIG. 12 is a perspective view of a sixth embodiment of the power transmission device, FIG. 13 is a cross-section along the line XIII—XIII in FIG. 12, FIG. 14 is a perspective view of a seventh embodiment of the power transmission device, FIG. 15 is a cross-section along the line XV—XV in FIG. 14, FIG. 16 is a perspective view of an eighth embodiment of the power transmission device, FIG. 17 is a cross-section along the line XVII—XVII in FIG. 16, FIG. 18 is a perspective view of a ninth embodiment of the power transmission device, FIG. 19 is a cross-section along the line XIX—XIX in FIG. 18, FIG. 20 is a perspective view of a tenth embodiment of the power transmission device, FIG. 21 is a cross-section along the line XXI—XXI in FIG. 20, and FIGS. 22 and 23 illustrate set of curves describing the lowered noise level of the power transmission device while the power transmission device is rotating unloaded and loaded, respectively.

The power transmission device shown in the FIGS. 1 and 2 of the drawings comprises a belt pulley 1 and an endless belt 2. The belt runs at least around one further drive means comprising usually a second belt pulley, a shaft pivot, a belt drum, or similar.

The belt pulley 1 is mounted on a shaft 4, and a cogging 5 is formed on the outer periphery of said pulley. A corresponding cogging 6 is formed on the inner surface of the belt 2.

According to the invention, two peripheral grooves 7 are turned on the periphery of the belt pulley at right angles to the cogs of the cogging 5. The grooves divide the cogging into three equally wide cog rings 5A, 5B, 5C. Of course, the individual cog rings formed need not be equally wide but their relative width may vary. The grooves extend somewhat below the bottoms of the cogs, as best appears from FIG. 2.

The cogging of the drive means 3 is preferably provided with similar grooves as the cog belt pulley 1.

In the embodiment shown in FIGS. 3 and 4, the noise suppressing grooves 17 are formed on the inner surface of the cog belt 2 so as to divide the cogging 6 of the belt into three separate cog rings 6A, 6B, 6C. In this case, a conventional cogging 5 is formed in the belt pulley 1. The belt is shown provided with a conventional support fabric 18.

In the embodiment shown in FIGS. 5 to 7, wedge-shaped grooves 27 are formed in the cog gaps of the cogging 5 of the cog wheel 1 on both sides of the cog wheel so that air can be discharged along the grooves. The length of the grooves transversally of the cogging may vary but is preferably of the same size as the width of the grooveless intermediate part remaining in the middle. Nor need the grooves be wedge-shaped but may, depending on the way they are made, be of different shapes.

In the embodiment shown in FIGS. 8 to 10, a groove 37 having a width of the entire cog wheel is made in the cog gaps of the cogging 5 of the cog wheel. The position of said groove in the cog gap may vary as well as its depth and shape. Preferably, however, the groove is located closer to that edge of the cog gap on which the cog of the belt 2 last engages the surface.

In the embodiment shown in FIG. 11, two holes 47 are made in each cog gap of the cogging 5 of the belt pulley 1, said holes ending in the lateral surfaces of the belt pulley. Air is discharged through these holes from between the cogs into the atmosphere as the coggings are positioned against each other.

In the embodiment shown in FIGS. 12 and 13, holes 57a extending through the cog wheel are bored in the axial direction of the cog wheel 1. The cog gaps of the cogging 5 are connected to said holes by means of radial holes 57b whereby air can be discharged this way. The axial holes are preferably larger than the radial holes, which facilitates the discharge of air.

In the embodiment shown in FIGS. 14 and 15, holes 67 are made in the cog wheel 1, which has a flange narrower than the cog ring, straight through the cog ring from the cog gaps of the cogging 5 to the surface of the periphery facing the axis. Depending on the thickness of the flange, the holes can be positioned in different ways and, if necessary, be bored obliquely in order to obtain a suitable hole spacing.

In the embodiment shown in FIGS. 16 and 17, holes 77 extending from the cog gaps of the cogging 6 to the outer surface are made in the cog belt 2, air being discharged along said holes.

In the embodiment shown in FIGS. 18 and 19, the air discharge passages are formed by making in the cogging 5 of the cog wheel 1 channels 87 leading from one cog gap to another by means of two crossing holes intersecting each other.

In the embodiment shown in FIGS. 20 and 21, the air discharge passages are formed by making under the cogs of the cogging 5 of the cog wheel 1 channels 97 leading from one cog gap to another by means of two crossing holes intersecting each other.

It has been noted that fitting the cogging of the belt pulley with air discharge passages substantially reduces the noise otherwise caused by a wide belt. In one example, two grooves at a distance from 30 mm from each other and the edges of the cogging were bored in the 90 mm wide cogging of two belt pulleys. The width of the grooves was 4 mm and the depth 8 mm, whereby the grooves extended about 4 mm underneath the bottom of the cogs. The cog wheels were connected by means of a conventional cog belt, and one of the cog wheels was rotated by means of an electric motor.

The FIGS. 22 and 23 illustrate the noise caused by the belt pulleys according to said example, as compared to the noise produced by similar grooveless belt pulleys, curve B. The noise produced by the belt pulleys provided with grooves without load (FIG. 22) at a frequency of 2 kHz was considerably smaller, with the biggest difference being about 8 dB, and the total noise amount was about 6 dB smaller than when using grooveless cog wheels.

When the power transmission device is loaded (FIG. 23) and the belt is transmitting a power of about 55 kW, the biggest noise difference at high frequencies is about 10 dB and the difference of the total noise amount is about 8 dB in favour of grooved belt pulleys. The relative importance of high frequencies in noise is, as far as the sharpness of hearing is concerned, much greater than the importance of low frequencies so that the invention has a particularly advantageous effect on the most harmful noise.

The drawings and the description related thereto are only intended to illustrate the idea of the invention. In the details, the power transmission device according to the invention may vary considerably within the scope of the claims. Thus it is, when necessary, possible to provide both the cogging of the cog wheel and the cogging of the belt with a groove or grooves of the kind described and/or with holes as described above. The holes can be circular, elliptical or of any other shape. Holes located after each other in the direction of movement of the cogs need not necessarily be aligned but they can in successive cog gaps be located axially in different positions. Nor need the holes made in the cog gaps be radial but they may be oblique in any direction.

The holes and the grooves can be located in different locations in the cog gaps in the direction of movement of the cogs but, preferably, they are located closer to that edge of the cog gap on which the cog last engages the surface.

When necessary, the embodiments described can also be combined in different ways. If only possible, it is preferred that all cog wheels and the belt or belts included in the power transmission device are provided with air discharge means according to the invention, whereby a high suppressing effect is achieved.

What I claim is:

1. Cog-belt-driven, noise-suppressed power transmission device comprising a belt pulley provided with a cogging on the outer periphery and a belt provided with a corresponding cogging on the inner surface, engaging said cogging of the belt pulley, whereby said belt rotates around said belt pulley and a second drive means for transmitting power between said belt pulley and said drive means, wherein said cogging of the belt pulley and/or the belt is provided with one or more discharge channels for air entrapped between the coggings, said discharge channels connecting the cog gaps to the atmosphere, said cogging or said coggings are further provided with at least one groove parallel with the direction of rotation wherein said groove extends underneath the cog bottoms of said cogging.

2. A power transmission device according to claim 1, wherein said groove or said grooves divide the cogging into separate, most preferably equally wide cog rings.

3. A power transmission device according to claim 1, wherein said groove extends straight through thereby enabling the free flow of air.

* * * * *